United States Patent
Yamada et al.

[11] Patent Number: 6,010,759
[45] Date of Patent: *Jan. 4, 2000

[54] COMPOSITE CONTAINER HAVING BARRIER PROPERTY

[75] Inventors: Kazuki Yamada; Hirotaka Tsunoda; Hideki Kurokawa, all of Tokyo-to, Japan

[73] Assignee: Dai Nippon Printing Co., Ltd., Tokyo-to, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/946,623

[22] Filed: Oct. 7, 1997

Related U.S. Application Data

[62] Division of application No. 08/372,976, Jan. 17, 1995, Pat. No. 5,695,839, which is a division of application No. 07/791,080, Nov. 12, 1991, Pat. No. 5,433,982.

[30] Foreign Application Priority Data

| Nov. 14, 1990 | [JP] | Japan | 2-308045 |
| Aug. 13, 1991 | [JP] | Japan | 3-202938 |
| Aug. 13, 1991 | [JP] | Japan | 3-202939 |
| Aug. 13, 1991 | [JP] | Japan | 3-202940 |
| Aug. 21, 1991 | [JP] | Japan | 3-209384 |
| Aug. 21, 1991 | [JP] | Japan | 3-209385 |
| Aug. 21, 1991 | [JP] | Japan | 3-209386 |

[51] Int. Cl.[7] .................. B65D 5/40; B32B 1/02
[52] U.S. Cl. ............ 428/35.7; 428/34.2; 428/339; 428/476.3; 229/5.84
[58] Field of Search .................. 428/35.7, 34.2, 428/339, 476.3; 229/3.1, 3.5 R, 5.84

[56] References Cited

U.S. PATENT DOCUMENTS

| 4,669,640 | 6/1987 | Ando et al. | 222/541 |
| 4,777,088 | 10/1988 | Thompson et al. | 428/323 |
| 4,813,578 | 3/1989 | Gordon et al. | 222/541 |
| 4,816,308 | 3/1989 | Shimizu et al. | 428/36.7 |
| 4,908,272 | 3/1990 | Harada et al. | 428/412 |
| 4,940,612 | 7/1990 | Gibbons et al. | 428/34.2 |
| 4,950,570 | 8/1990 | Massouda | 428/34.2 |
| 4,988,546 | 1/1991 | Tanner et al. | 428/34.2 |
| 4,999,229 | 3/1991 | Moritani et al. | 428/36.6 |
| 5,028,462 | 7/1991 | Matlack et al. | 428/35.7 |
| 5,049,624 | 9/1991 | Adams et al. | 525/371 |
| 5,055,355 | 10/1991 | DeAntonis et al. | 428/476.3 |
| 5,059,459 | 10/1991 | Huffman | 428/34.2 |
| 5,093,163 | 3/1992 | Bauer et al. | 428/35.4 |
| 5,106,693 | 4/1992 | Harada et al. | 428/412 |
| 5,433,982 | 7/1995 | Yamada et al. | 428/35.7 |
| 5,695,839 | 12/1997 | Yamada et al. | 428/35.7 |

*Primary Examiner*—Rena L. Dye
*Attorney, Agent, or Firm*—Ladas & Parry

[57] ABSTRACT

A composite container having a barrier property and comprising a packaging material which comprises an inner surface layer, a barrier layer, and a base material layer wherein the barrier layer comprises one selected from nylon MXD 6 and a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid. The above packaging material may also comprise an inner surface layer having a barrier property and a base material layer wherein the inner surface layer having a barrier property comprises the above semi-aromatic polyamide resin. Such a composite container having a barrier property has both of a good barrier property and a sufficient strength, and is capable of being produced at a low cost without complicating the production process to be used therefor.

15 Claims, 5 Drawing Sheets

COMPOSITE CONTAINER HAVING BARRIER PROPERTY

This is a divisional of application Ser. No. 08/372,976 filed Jan. 17, 1995; now U.S. Pat. No. 5,695,839, which is a Divisional of Ser. No. 07/791,080 filed Nov. 12, 1991 now U.S. Pat. No. 5,433,982,

BACKGROUND OF THE INVENTION

The present invention relates to a composite container having a barrier property, particularly to a composite container which has a good barrier property and a sufficient strength, and is capable of being produced at a low cost without complicating the production process to be used therefor.

Hitherto, when a composite container which is required to have a gas barrier property is produced, there has generally been used a production process wherein the packaging material for constituting such a container is caused to have a laminate structure, and a layer of an aluminum foil is disposed or interposed in the laminate structure. In addition, such a container is generally disposable, i.e., is thrown away after a single use thereof.

However, it has recently been required that the resources (or natural resources) are to be recycled. From such a viewpoint, there has been demanded a container which is capable of being collected after the use thereof and being separated into the respective materials constituting the container so that the thus separated materials can be recycled or reused. However, in the case of the conventional container formed from the packaging material as described above using the aluminum foil, there has been posed a problem such that the aluminum foil disposed or laminated between the layers of resins or papers cannot be easily separated and collected.

In order to solve such a problem, there have been developed containers of various types which have a good barrier property without using a metal thin film such as an aluminum foil. For example, Japanese Laid Open Patent Application (JP A, KOKAI) No. 22624/1988 discloses a container which is formed from a packaging material having a five layer structure comprising a polyethylene (PE) resin layer/a paper layer/a PE resin layer/a nylon 6 layer/and a PE resin layer disposed from the inner side of the container; Japanese Laid Open Patent Application No. 312143/1988 discloses a container which is formed from a packaging material having a five layer structure comprising a polyethylene (PE) resin layer/a paper layer/a PE resin layer/an ethylene-vinylalcohol copolymer (EVOH) layer/and a PE resin layer disposed from the inner side of the container; Japanese Laid Open Patent Application No. 160551/1990 discloses a container which is formed from a packaging material having a six layer structure comprising a polyethylene (PE) resin layer/a paper layer/a PE resin layer/an EVOH layer/a nylon 6 layer/and a PE resin layer disposed from the inner side of the container; etc.

However, among these conventional containers, the first container as described above has a problem such that the Nylon 6 layer only provides an insufficient gas barrier property. Further, in the case of the second container as described above, the EVOH layer may provide a good barrier property but it does not have a sufficient strength. In addition, when such a container is used as one for containing a soft drink, since the EVOH layer may take up water and the barrier property of the EVOH layer may extremely decrease when the EVOH layer contacts such a content, it is required to subject the end surface disposed inside of the container to a treatment such as skiving so that the EVOH layer may be covered with another material. As a result, the second container has a problem such that it requires a complicated production process. Further, in the case of the third container as described above, since the substrate material layer is disposed outside the EVOH layer and the nylon 6 layer, the container can have both of an excellent barrier property and a sufficient strength but it requires a higher production cost because it has both of the EVOH layer and the nylon 6 layer.

On the other hand, in a case where a pouring member is mounted the above composite container having a barrier property, it has been used a method wherein a pouring member, e.g., comprising a polyolefin resin such as polyethylene is inserted into an opening formed in the main body of the composite container so that it is penetrated from the inner side of the main body of the composite container, and a flange portion of the pouring member is fixed to the inner peripheral surface of the main body of the composite container.

In the case of the conventional composite container having such a pouring member mounted thereto, when the polyolefin type resin layer is formed at the time of the production of the laminate sheet as a material constituting the container, or when the container is formed from the laminate sheet, the polyolefin type resin is subjected to pyrolysis to produce a volatile component such as aliphatic hydrocarbons. Therefore, such a container has a problem such that the volatile component may migrate to the content such as an orange juice contained in the container so that the taste of the content may be changed or an odor is imparted to the content; or the flavor or taste of the content is impaired because the polyolefin type resin layer constituting the inner peripheral surface layer is liable to adsorb or transmit the flavor component of the content such as the orange juice.

From such a viewpoint, there has been investigated or researched, as a composite container which is excellent in a flavor component retaining property, a composite container wherein the inner layer comprises a layer of a semi-aromatic polyamide resin which is a copolymer comprises an aromatic polyamide forming component comprising an aliphatic diamine and isophthalic acid and/or terephthalic acid; and an aliphatic polyamide forming component comprising a lactam or an aliphatic diamine and an aliphatic dicarboxylic acid.

However, according to the present inventor's investigation, when a pouring member comprising an integrally molded member comprising a polyolefin type resin such as polyethylene is intended to be applied or mounted to such a composite container having a flavor component retaining property, a sufficient adhesion property between the container and the pouring member has not been obtained.

SUMMARY OF THE INVENTION

An object of the present invention is, in view of the above problems encountered in the prior art, to provide a composite container having a barrier property which has both of a good barrier property and a sufficient strength, and is capable of being produced at a low cost without complicating the production process to be used therefor.

Another object of the present invention is to provide a composite container having a barrier property which is equipped with a pouring member.

According to a first aspect of the present invention, there is provided a composite container having a barrier property and comprising a packaging material which comprises:

an inner surface layer comprising a polyolefin type resin, a barrier layer, and a base material layer wherein at least the outermost layer thereof comprises an olefin type resin, wherein the barrier layer comprises one selected from nylon MXD6 and a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid.

According to the above first aspect of the present invention, the resultant container has both of a barrier property and a strength. In addition, since a reinforcing layer is not required to be disposed therein, the production process for producing such a container can be simplified and the production cost can be reduced.

According to a second aspect of the present invention there is provided a composite container having a barrier property and comprising a packaging material which comprises:

an inner surface layer having a barrier property, and a base material layer wherein at least the outermost layer thereof comprises an olefin type resin, wherein the inner layer having a barrier property comprises a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid.

According to the above second aspect of the present invention, there may be provided a composite container having a barrier property which has not only an excellent gas barrier property, an excellent flavor barrier property and a sufficient strength, but also has an excellent suitability to a container for a drink, and is capable of being produced at a low cost by use of a simplified production process.

According to a third aspect of the present invention, there is provided a composite container having a barrier property and comprising a container main body having an opening and a pouring member which has been inserted into the opening formed in the container main body from the inside of the container main body, wherein the container main body comprises an inner surface layer comprising a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid; the pouring member comprises a pouring member forming material comprising an adhesive polyolefin type resin, and has a flange portion; and the flange portion is fixed to the inner surface layer of the container main body.

According to a fourth aspect of the present invention, there is provided a composite container having a barrier property and comprising a container main body having an opening and a pouring member which has been inserted into the opening formed in the container main body from the inside of the container main body, wherein the container main body comprises an inner surface layer comprising a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid; the pouring member comprises a pouring member forming material comprising the semi-aromatic polyamide resin, and has a flange portion; and the flange portion is fixed to the inner surface layer of the container main body.

According to a fifth aspect of the present invention, there is provided a composite container having a barrier property and comprising a container main body having an opening and a pouring member which has been inserted into the opening formed in the container main body from the inside of the container main body, wherein the container main body comprises an inner surface layer comprising a semi-aromatic polyamide resin, which is a copolymer comprising an aromatic polyamide forming component and an aliphatic polyamide forming component wherein the aromatic polyamide forming component comprises an aliphatic diamine and isophthalic acid and/or terephthalic acid, and the aliphatic polyamide forming component comprises a lactam or an aliphatic diamine, and an aliphatic dicarboxylic acid; the pouring member comprises a pouring member forming material comprising a polyolefin type resin, and has a flange portion; and the flange portion is fixed to the inner surface layer of the container main body by the medium of a laminating material comprising a semi-aromatic polyamide resin layer comprising the semi-aromatic polyamide resin.

According to the above third, fourth and fifth aspects of the present invention, there may be provided a composite container equipped with a pouring member which has not only an excellent gas barrier property, an excellent flavor barrier property and a practical (or a practically acceptable) strength, but also has a good adhesion property between the pouring member and the main body of the container so that the pouring member and the main body of the composite container cannot be easily separated or peeled from each other.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the present invention will be described in detail with reference to preferred embodiments of the present invention.

Figure 1:
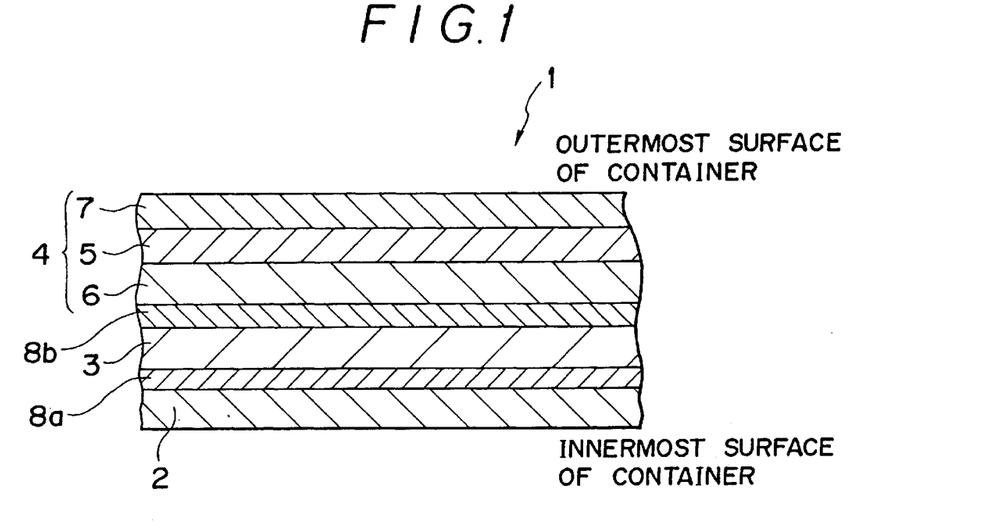
FIG. 1 is a schematic sectional view showing a packaging material to be used for the composite container having a barrier property according to the present invention.

FIG. 1 is a schematic sectional view showing a packaging material for forming the composite container having a barrier property according to an embodiment of the present invention.

In FIG. 1, a packaging material 1 comprises a laminate comprising an inner layer 2 for providing an innermost surface of the container, a barrier layer 3 disposed outside the inner layer 2 by the medium of an adhesive layer 8a, and a base material layer 4 disposed outside the barrier layer 3 by the medium of an adhesive layer 8b.

The inner layer 2 may comprise a polyolefin type resin such as low density polyethylene, medium density polyethylene ethylene-α olefin copolymer, and ethylene-vinylacetate copolymer. The inner layer 2 is a layer for heat fusing the inner layers 2 with each other, or heat fusing the inner layer 2 with an outermost layer of the base material layer 4 at the time of the formation of the composite container. The adhesive layers 8a and 8b to be disposed between the inner layer 2 and the barrier layer 3 and between the barrier layer 3 and the base material layer 4 may predominantly comprise an adhesive polyolefin type resin (or a polyolefin type resin having an adhesive property).

As such an adhesive polyolefin type resin to be used for the adhesive layers 8a and 8b, there may be used a poly α-olefin such as polyethylene, ethylene-α olefin copolymer, polypropylene, polybutene, and polyisobutylene; a polydiolefin such as polybutadiene, and polyisoprene; or a copolymer etc., comprising one or at least two species of ethylene type unsaturated monomers. Such an ethylene type unsaturated monomer may singly have a carbonyl group based on carboxylic acid, carboxylic acid salt, carboxylic acid anhydride, carboxylic acid ester, carboxylic acid amide, carboxylic acid imide, aldehyde, ketone, etc.; or may have such a carbonyl group in combination with cyano group, hydroxy group, ether group or oxirane ring, etc.

Specific examples of the ethylene type unsaturated monomer used for such a purpose may include:

(A) ethylene type unsaturated carboxylic acid:
acrylic acid, methacrylic acid, maleic acid, fumaric acid, crotonic acid, itaconic acid, citraconic acid, 5-norbornen-2,3-dicarboxylic acid, etc., (B) ethylene type unsaturated carboxylic acid anhydride:
maleic acid anhydride, citraconic acid anhydride, 5-norbornen-2,3-dicarboxylic acid anhydride, tetrahydrophthalic acid anhydride, etc., (C) ethylene type unsaturated ester:
ethyl acrylate, methyl methacrylate, 2-ethylhexyl acrylate, monoethyl or diethyl maleate, vinylacetate, vinyl propionate, γ-hydroxy propyl methacrylate, β-hydroxy ethylacrylate, glycidyl acrylate, glycidyl methacrylate, β-N-ethylaminoethyl acrylate, etc., (D) ethylene type unsaturated amide or imide:
acrylamide, methacrylamide, maleinimide, etc.,

(E) ethylene type unsaturated aldehyde or ketone:
acrolein, methacrolein, vinyl methylketone, vinyl butyl ketone, etc.

It is also possible to incorporate a polyolefin resin, particularly polyethylene, into the adhesive layer 8a comprising such an adhesive polyolefin type resin. In such a case, the amount of the above adhesive polyolefin type resin contained in the adhesive layer 8a may preferably be 40 wt. % or larger. When the amount of the adhesive polyolefin type resin layer is smaller than 40 wt. %, the adhesive property of the adhesive layer 8a to the barrier layer 3 may undesirably be decreased. Such an adhesive layer 8a may preferably have a thickness of about 3 to 30 μm. In addition, the inner layer 2 may preferably have a thickness of 5 to 100 μm.

The barrier layer 3 may generally comprise a semiaromatic polyamide resin comprising an aromatic polyamide forming component comprising an aliphatic diamine and isophthalic acid and/or terephthalic acid; and an aliphatic polyamide forming component comprising a lactam or an aliphatic diamine, and an aliphatic dicarboxylic acid; or Nylon MXD6 comprising a aromatic polyamide resin produced by a polycondensation reaction between metaxylenediamine and adipic acid.

More specifically the above, semi-aromatic polyamide resin may generally comprise a copolymer comprising 100 to 60 wt. % of an aromatic polyamide forming component comprising an aliphatic diamine and isophthalic acid and/or terephthalic acid; and 0 to 40 wt. % of an aliphatic polyamide forming component comprising a lactam or an aliphatic diamine and an aliphatic dicarboxylic acid. Such a semi-aromatic polyamide resin has a lower crystallinity as compared with that of an ordinary aliphatic polyamide resin, and shows a characteristic of an amorphous resin. The semi-aromatic polyamide resin may be caused to directly contact a liquid content such as a soft drink to be contained in the container without a decrease of the barrier property, unlike the EVOH resin as described above, and therefore the treatment such as skiving to be used for the end surface of the packaging material is not required so that the production process for the container may be simplified. In addition, the semi-aromatic polyamide resin has a strength which is comparable to that of the Nylon 6 resin, and therefore the provision of a reinforcing layer is not required so that the production cost for the container can be reduced.

On the other hand, the Nylon MXD6 as described above is a crystalline thermoplastic polymer which is capable of being produced by a polycondensation reaction between meta-xylenediamine (MXDA) and adipic acid, and is a polyamide resin represented by the following chemical formula.

In the above formula, n denotes an integer satisfying a relationship of 10<n<10,000.

The Nylon MXD6 has a good barrier property on the basis of the aromatic ring contained in the main chain thereof.

Figure 2:
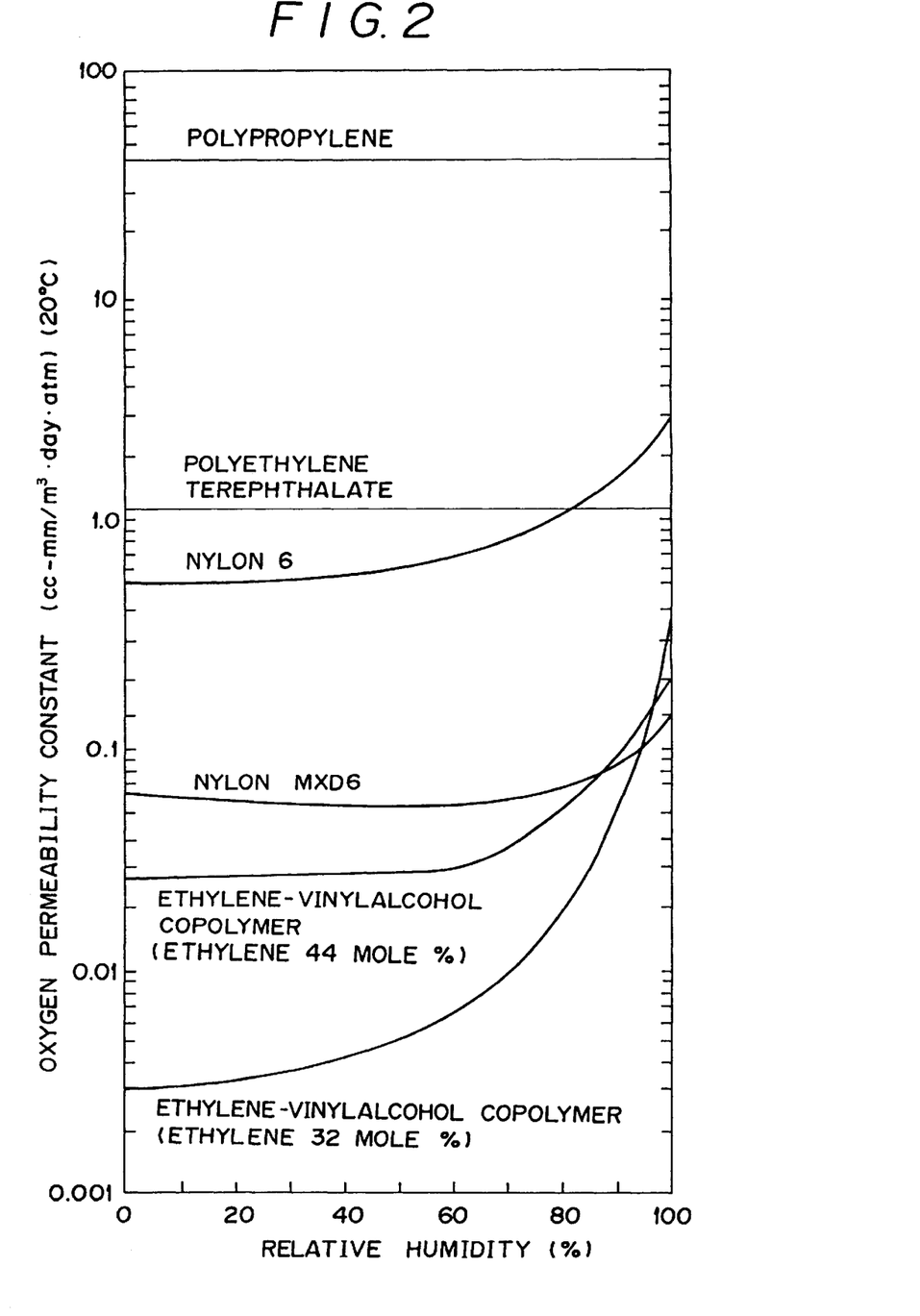
FIG. 2 is a graph showing an oxygen permebility constant (or coefficient) of each of nylon MXD6 and other resins.

FIG. 2 is a graph showing an oxygen permeability constant (or coefficient) of each of Nylon MXD6 and other resins. As apparent from FIG. 2, the Nylon MXD6 has a lower oxygen permeability constant under a relative humidity of 100% which is important for a container for containing a liquid content such as a soft drink, as compared with not only the conventional Nylon 6 but also the ethylene vinyl alcohol copolymer (EVOH).

Therefore, the treatment such as skiving to be used for the end surface of the packaging material comprising EVOH resin is not required so that the production process for the container may be simplified. In addition, the Nylon MXD6 has a strength which is comparable to that of the Nylon 6 resin, and therefore the provision of a reinforcing layer is not required so that the production cost for the container can be reduced.

The semi-aromatic polyamide resin or the Nylon MXD6 may preferably be contained in the barrier layer 3 in an amount of about 20 to 100 wt. %. When the amount of the semiaromatic polyamide resin or the Nylon MXD6 contained in the barrier layer 3 is smaller than 20 wt. %, a sufficient barrier property cannot be provided in some cases.

The barrier layer 3 may preferably have a thickness of about 5 to 60 $\mu$m. When the barrier layer 3 has a thickness of below 5 $\mu$m, a sufficient barrier property cannot be provided in some cases. On the other hand, when the thickness of the barrier layer 3 exceeds 60 $\mu$m, the nerve or stiffness of the material is too strong at the time of the formation of the container, so that not only the container formation becomes somewhat difficult but also the production cost may undesirably be increased.

The base material layer 4 has a three layer laminate member comprising a support (or substrate) 5, and resin layers 6 and 7 of an olefin type resin disposed on both surfaces of the support 5. As the support 5, it is possible to use paper, a biaxially oriented polyester film, a biaxially oriented polypropylene film, etc. The support 5 is not restricted to one having a one layer structure but may also be a laminate. The support 5 may preferably have a thickness of about 100 to 600 $\mu$m. The polyolefin type resin layers 6 and 7 to be disposed on both sides of the support 5 may particularly preferably be polyethylene resin layer. The resin layers 6 and 7 may preferably have a thickness of about 10 to 60 $\mu$m. The base material layer 4 may also have a two layer structure comprising the support 5 and the polyolefin type resin layer disposed on one side thereof. In a case wherein base material layer 4 has such a two layer structure, however, the barrier layer 3 as described above is disposed on one of the surfaces of the base material layer 4 at which the support 5 is exposed, and the polyolefin resin layer constitutes an outermost layer.

The adhesive layer 8b for laminating the barrier layer 3 and the base material layer 4 may comprise an adhesive which is similar to that constituting the adhesive layer 8a as described above, or may also comprise a layer of an isocyanate type adhesive. Such an isocyanate type adhesive to be used for such a purpose may be a two component curing type (or two liquid curing type) adhesive which comprises a polyester polyurethane type resin or a polyether polyurethane type resin as a base component (or main comonent) and is capable of being cured (or hardened) by use of a curing agent such as tolylene diisocyanate and xylene diisocyanate.

It is preferred to subject the surface of the base material layer 4 contactable to the adhesive layer 8b (i.e., polyolefin type resin layer 6) to a corona discharging treatment. When such a treatment is used, the adhesion strength between the base material layer 4 and the adhesive layer 8b may further be improved.

The composite container having a barrier property according to the present invention may be prepared, e.g., by cutting or punching the packaging material as described above so as to provide a predetermined shape and heat sealing the resultant punched product by hot air heating, flame heating, etc.

Figure 3:
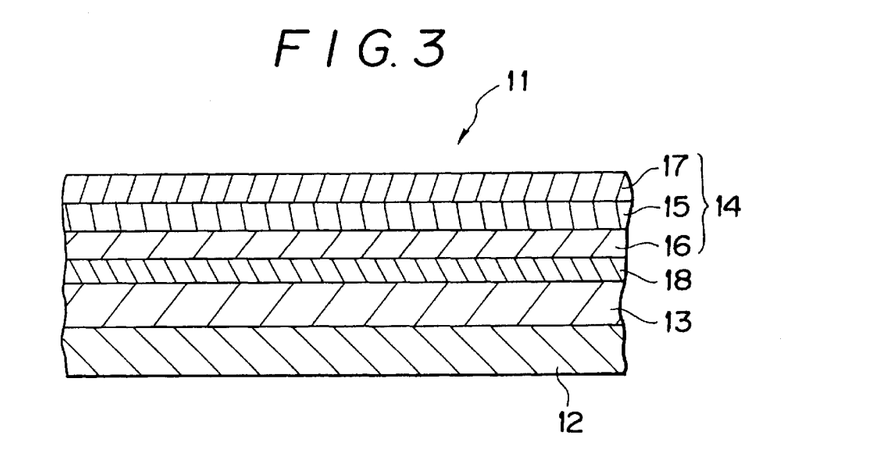
FIGS. 3 and 4 are schematic sectional views each showing a packaging material to be used for the composite container having a barrier property according to the present invention.

FIG. 3 is a schematic sectional view showing a packaging material for forming the composite container having a barrier property according to another embodiment of the present invention.

In FIG. 3, a packaging material 11 comprises a laminate comprising an inner layer 12 for providing an innermost surface of the container, a barrier layer 13 directly disposed outside the inner layer 12, and a base material layer 14 disposed outside the barrier layer 13 by the medium of an adhesive layer 18.

The above packaging material 11 is characterized in that the inner layer 12 thereof comprise a carboxyl group containing polyethylene resin. The barrier layer 13, the adhesive layer 18 and the base material layer 14 may be the same as the barrier layer 3, the adhesive layer 8a and the base material layer 4, respectively, constituting the packaging material 1 as described above, and therefore the detailed description of these layers is omitted.

The carboxyl group containing polyethylene resin constituting the inner layer 12 has an adhesive property to the semi-aromatic polyamide resin or the Nylon MXD6 constituting the barrier layer 13. Accordingly, in this embodiment, such an inner layer 12 is directly disposed on the barrier layer 13 without using an adhesive layer to be disposed therebetween. In this point, the packaging material 11 is different from the packaging material 1 as described above.

Specific examples of the above carboxyl group containing polyethylene resin may include, e.g., an ethylene-methacrylic acid copolymer resin (EMAA), an ethylene-acrylic acid copolymer resin (EAA), an ionomer resin, an ethylene-maleic acid anhydride copolymer resin, an ethyl acrylate maleic acid anhydride copolymer resin, etc. The inner layer comprising such a carboxyl group containing polyethylene resin may preferably have a thickness of about 5 to 100 $\mu$m.

Figure 4:
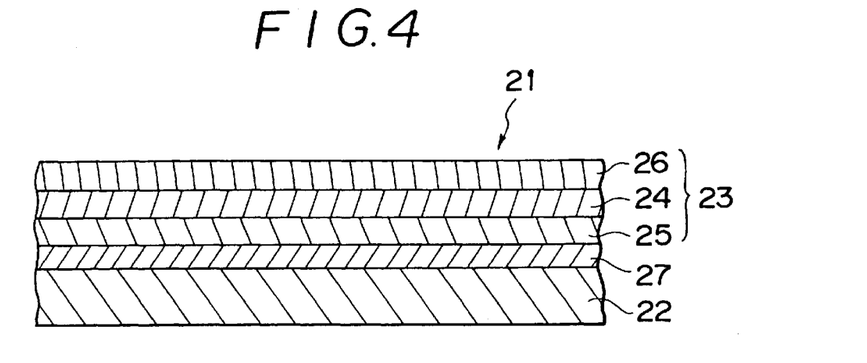

FIG. 4 is a schematic sectional view showing a packaging material for forming the composite container having a barrier property according to a further embodiment of the present invention.

In FIG. 4, a packaging material 21 comprises a laminate comprising an inner layer 22 having a barrier property and a base material layer 23 disposed outside the inner layer 22 having a barrier property by the medium of an adhesive layer 27.

The semi-aromatic polyamide resin as described above may preferably be contained in the inner layer 22 having a barrier property in an amount of about 20 to 100 wt. %. When the amount of the semi-aromatic polyamide resin contained in the inner layer 22 is smaller than 20 wt. %, a sufficient barrier property cannot be provided in some cases.

The inner layer 22 having a barrier property may preferably have a thickness of about 5 to 60 $\mu$m. When the inner layer 22 having a barrier property has a thickness of below 5 $\mu$m, a sufficient barrier property cannot be provided or a sufficient sealing strength cannot be provided in some cases. On the other hand, when the thickness of the inner layer 22 exceeds 60 $\mu$m, the nerve or stiffness of the material is too strong at the time of the formation of the container, so that not only the container formation becomes somewhat difficult but also the production cost may undesirably be increased.

The adhesive layer 27 for laminating the barrier layer 22 and the base material layer 23 may comprise an adhesive which is similar to that constituting the adhesive layer 8a of the packaging material 1 as described above. The adhesive layer 27 may preferably have a thickness of about 1 to 30 $\mu$m.

The base material layer 23 comprises a three layer laminate comprising a support 24 and olefin type resin layers 25 and 26 disposed on both sides thereof and may have the same structure as that of the base material layer 4 as described above. Accordingly, the base material layer 23 may also have a two layer structure comprising the support 24 and a polyolefin type resin layer disposed on one side thereof.

It is preferred to subject the surface of the base material layer 23 contactable to the adhesive layer 27 (i.e., polyolefin type resin layer 25) to a corona discharging treatment. When such a treatment is used, the adhesion strength between the base material layer 23 and the adhesive layer 27 may further be improved.

Figure 5:
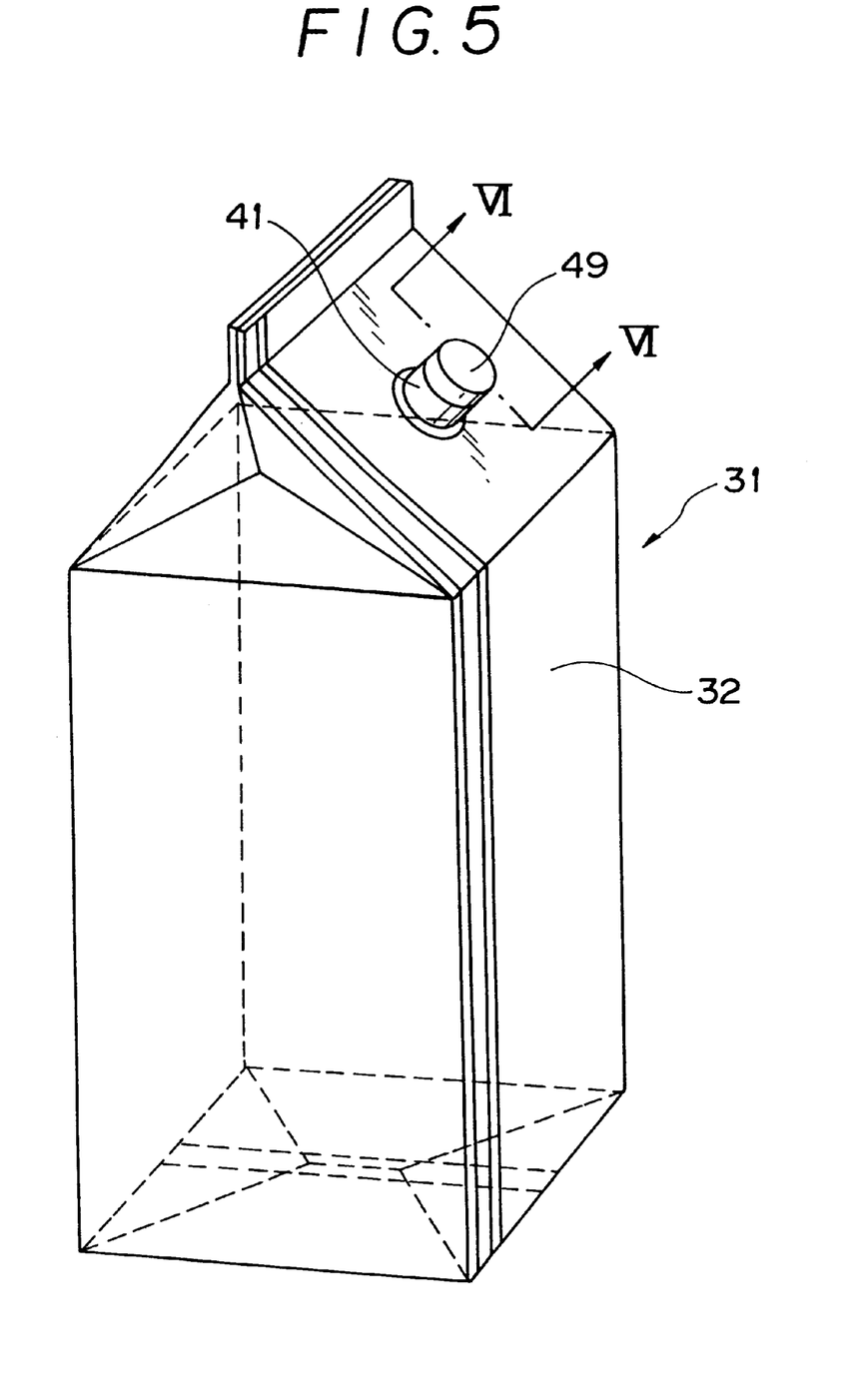
FIG. 5 is a schematic perspective view showing an embodiment of the composite container equipped with a pouring member according to the present invention.

FIG. 5 is a schematic perspective view showing an embodiment of the composite container having a barrier property and equipped with a pouring member according to the present invention.

Figure 6:
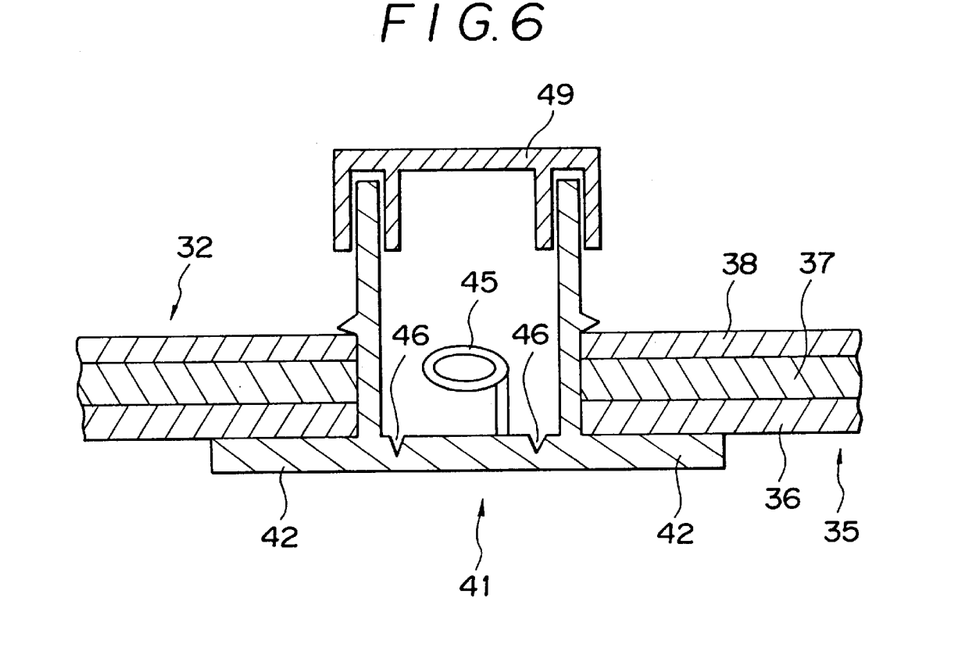
FIG. 6 is a schematic sectional view showing a cross section of the composite container equipped with a pouring member taken along the line VI—VI shown in FIG. 5.

FIG. 6 is a schematic sectional view showing a cross section of the composite container equipped with a pouring member taken along the line VI—VI shown in FIG. 5.

As shown in FIG. 5, the composite container 31 having a barrier property and equipped with a pouring member comprises a main body 32 of the composite container and a pouring member 41.

As shown in FIG. 6, the main body 32 of the composite container is formed from a laminate sheet 35 for a composite container which comprises at least an inner layer 36 comprising a semi-aromatic polyamide resin, and, e.g., an intermediate layer 37 and an outermost layer 38 disposed or laminated thereon.

The semi-aromatic polyamide resin constituting the inner layer 36 may be the same as that described above. The semi-aromatic polyamide resin may generally have a lower crystallinity than that of an ordinary aliphatic polyamide resin and may show a characteristic of an amorphous resin. Accordingly, such a resin can be subjected to heat sealing (or heat fusing) at a relatively low temperature (e.g., at about 160° C.), and a composite container may be formed three dimensionally by use of such a heat sealing treatment.

The semi-aromatic polyamide resin may preferably be contained in the inner layer 36 of the main body 32 of the composite container in an amount of about 20 to 100 wt. %. When the amount of the semi-aromatic polyamide resin contained in the barrier-layer 3 is smaller than 20 wt. %, a sufficient barrier property cannot be provided in some cases.

The inner layer 36 may preferably have a thickness of about 5 to 60 μm. When the inner layer 36 has a thickness of below 5 μm, a sufficient barrier property cannot be provided in some cases. On the other hand, when the thickness of the inner layer 36 exceeds 60 μm, the nerve or stiffness of the material is too strong at the time of the formation of the container, so that not only the container formation becomes somewhat difficult but also the production cost may undesirably be increased.

The intermediate layer 37 to be disposed on the inner layer 36 may, for example, comprise paper, an aluminum foil, polyolefin type resin, a biaxially oriented polyester film, a biaxially oriented polypropylene film, etc., or a laminate of at least two species selected from these materials. The intermediate layer 37 may preferably have a thickness of about 100 to 600 μm.

The outermost layer 38 may comprise a resin such as polyolefin type resin which is capable of imparting a water resistance to the container. Specific examples of the polyolefin resin to be used for such a purpose may include low density polyethylene, medium density polyethylene, high density polyethylene, an ethylene-vinyl acetate copolymer, an ethylene-acrylic acid copolymer, an ethylene-methyl acrylate copolymer, an ethylene-α-olefin copolymer, polypropylene, etc. Among these, the polyethylene resins of various types are particularly preferred.

The outermost layer 38 may generally have a thickness of about 3 to 150 μm.

At least one adhesive layer (not shown) may generally be disposed between the inner layer 36 and the intermediate layer 37, and/or between the intermediate layer 37 and the outermost layer 38. Such an adhesive layer may comprise an adhesive which is the same as that constituting the adhesive layer 8b of the packaging material 1 as described above. The adhesive layer may preferably have a thickness of about 3 to 30 μm.

The main body 32 of the composite container is formed from the laminate sheet 35 for the composite container which has specifically been described hereinabove, e.g., by cutting or punching the laminate sheet 35 for the composite container as described above so as to provide a predetermined shape and heat sealing the resultant punched product by hot air heating, flame heating, etc. The main body 32 of the resultant composite container may have various shapes or configurations such as gable top type and brick type.

As shown in FIG. 6, a pouring member (or discharging member) 41 is inserted or introduced into an opening formed in the thus prepared main body 32 of the composite container from the inner side of the main body 32 of the composite container.

As shown in FIG. 6, the pouring member 41 has a flange portion 42 and may generally comprise an integrally molded member formed from a material for forming the pouring member (i.e., a pouring member forming material). The pouring member 41 may be constituted by use of a pouring member forming material comprising the adhesive polyolefin type resin or the semi-aromatic polyamide resin as described above.

The amount of the adhesive polyolefin type resin contained in the pouring member forming material as described above may generally be 40 to 100 wt. %, more preferably 60 to 100 wt. %. When the pouring member forming material contains another component in addition to the adhesive polyolefin type resin, specific examples of such a component may include polyethylene, an ethylene-α-olefin copolymer, an ethylene-methyl methacrylate copolymer, etc.

On the other hand, the amount of the semi-aromatic polyamide resin contained in the pouring member forming material as described above may generally be 20 to 100 wt. %, more preferably 60 to 100 wt. %. When the pouring member forming material contains another component in addition to the semi-aromatic polyamide resin, specific examples of such a component may include Nylon 6, Nylon 66, Nylon 12, polyethylene terephthalate (PET), etc.

The above pouring member forming material does not necessarily constitute the entirety of the pouring member 41, but it is possible that at least a portion of the pouring member 41 which is to be bonded to the main body 32 of the composite container, such as the flange portion 42, comprises the pouring member forming material as described above. The pouring member 41 may also be equipped with a pulling ring 45. In FIG. 6, the reference numeral 46 denotes a thin circular groove which facilities the breakage of the flange portion 42, and the reference numeral 49 denotes a cap for the pouring opening (or discharge outlet) which is mounted to the pouring opening of the pouring member 41.

The inner layer 36 of the main body 32 of the composite container and the flange portion 42 of the pouring member 41 are fused to each other under heating so that the flange portion 42 of the pouring member 41 is fixed to the inner peripheral surface 36 of the main body 32 of the composite container.

Figure 7:
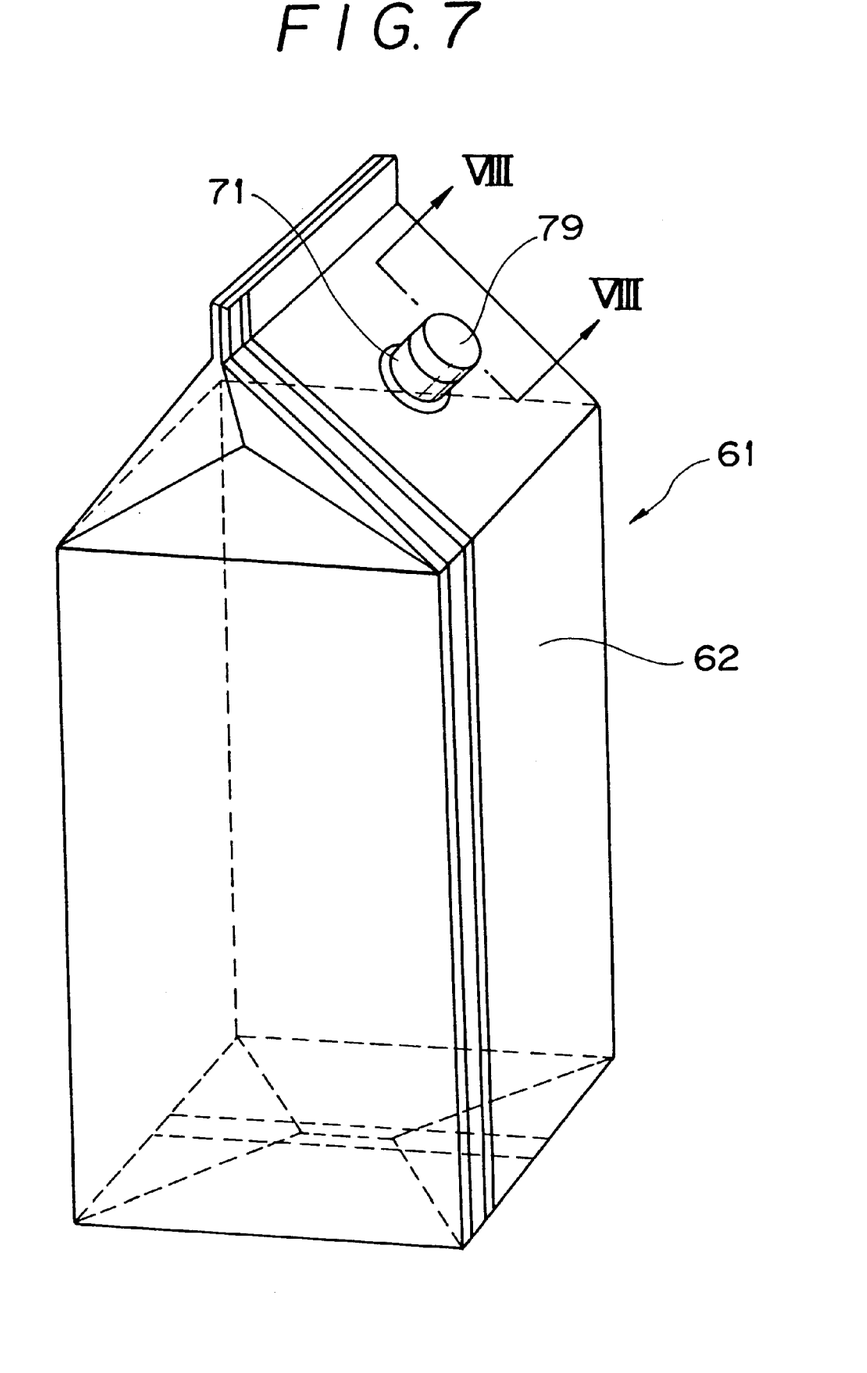
FIG. 7 is a schematic perspective view showing an embodiment of the composite container equipped with a pouring member according to the present invention.

FIG. 7 is a schematic perspective view for illustrating an embodiment of the composite container having a barrier property and equipped with a pouring member according to the present invention.

Figure 8:
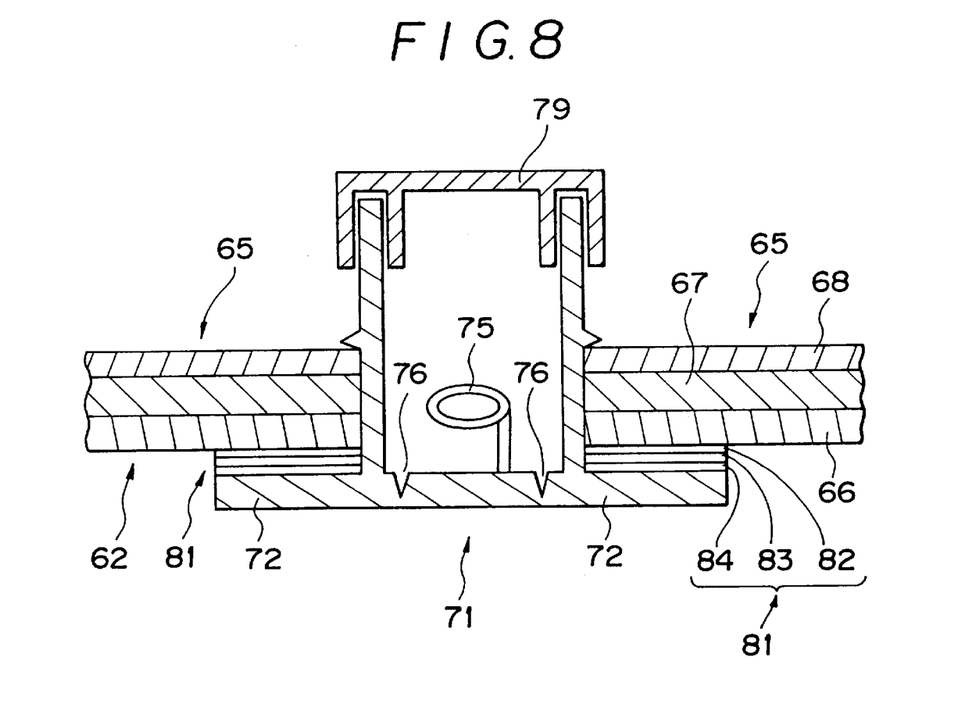
FIG. 8 is a schematic sectional view showing a cross section of the composite container equipped with a pouring member taken along the line VIII—VIII shown in FIG. 7.

FIG. 8 is a schematic sectional view showing a cross section of the composite container equipped with the pouring member taken along the line VIII—VIII shown in FIG. 7.

As shown in FIG. 7, the composite container 61 having a barrier property and equipped with a pouring member comprises a main body 62 of the composite container and a pouring member 71.

As shown in FIG. 8, the main body 62 of the composite container is formed from a laminate sheet 65 for a composite container which comprises at least an inner layer 66 comprising the semi-aromatic polyamide resin as described above, and, e.g., an intermediate layer 67 and an outermost layer 68 disposed or laminated thereon.

The inner layer 66, the intermediate layer 67 and the outermost layer 68 respectively correspond to the inner layer 36, the intermediate layer 37 and the outermost layer 38 of the main body 32 of the composite container as described above, and therefore the detailed description of these layers is omitted.

The pouring member 71 may for example comprise an integrally molded member formed from a polyolefin resin such as polyethylenes of various types, an ethylene-vinyl acetate copolymer, an ethylene-acrylic acid copolymer, an ethylene-methyl acrylate copolymer, an ethylene-α-olefin copolymer and, polypropylene. As shown in FIG. 8, the pouring member 71 has a flange portion 72. The pouring member 71 may also be equipped with a pulling ring 75. In FIG. 8, the reference numeral 76 denotes a thin circular groove -which facilitates the breakage of the flange portion 72, and the reference numeral 79 denotes a cap for the pouring opening (or discharge outlet) which is mounted to the pouring opening of the pouring member 71.

As shown in FIG. 8, a laminating material 81 is disposed between the flange portion 72 of the pouring member 71 and the inner peripheral surface layer 66 of the main body 62 of the composite container.

The laminating material 81 comprises a laminate comprising at least a semi-aromatic polyamide resin layer 82, and, e.g., a base material layer 83 and a polyolefin type resin layer 84.

The laminating material 81 is disposed between the flange portion 72 of the pouring member 71 and the inner layer 66 of the main body 62 of the composite container so that the above semi-aromatic polyamide resin layer 82 is disposed opposite to the inner layer 66 of the main body 62 of the composite container.

The semi-aromatic polyamide resin layer 82 comprises the semi-aromatic polyamide resin as described above, and may generally have a thickness of about 3 to 60 μm.

The base material layer 83 laminated on the semiaromatic polyamide resin layer 82 may for example comprise a stretched (or oriented) polyethylene terephthalate (PET) resin, an aluminum foil, a stretched polypropylene resin, a stretched nylon resin, etc., and may generally have a thickness of about 7 to 50 μm.

The polyolefin type resin layer 84 laminated on the above base material layer 83 may for example comprise a polyolefin type resin such as polyethylenes of various types, and may particularly preferably comprise a resin which is the same as the polyolefin type resin constituting the outermost layer 68 of the laminate sheet 65 for forming the above main body 62 of the composite container. When the polyolefin type resin constituting the polyolefin type resin layer 84 comprises the same resin as the polyolefin type resin constituting the outermost layer 68 of the main body 62 of the composite container, the adhesion property between the flange portion 72 of the pouring member 71 and the laminating material 81 may be improved.

The laminating material 81 having the above layer structure may generally have a thickness of, e.g., about 20 to 150 μm.

The laminating material 81 is not necessarily required to have the three layer structure as described above, but may also have a two layer structure, e.g., comprising the semi-aromatic polyamide resin layer 82 and the polyolefin type resin layer 84. However, when the laminating material 81 has such a two layer structure, the laminating material 81 is disposed between the pouring member 71 and the main body 62 of the composite container so that the above semi-aromatic polyamide resin layer 82 is disposed opposite to the inner layer 66 of the main body 62 of the composite container.

The inner layer 66 of the main body 62 of the composite container and the flange portion 72 of the pouring member 71 are fused to each other by the medium of the laminating material 81 under heating so that the flange portion 72 of the pouring member 71 is fixed to the inner surface 66 side of the main body 62 of the composite container.

Hereinbelow, the present invention will be described in further detail with reference to specific Experiment Examples.

Experiment Example 1

(Sample 1)

First, an acid resistant paper having a basis weight of 400 g/m$^2$ was used as a support, and a low density polyethylene resin (Mirason 16sp, mfd. by Mitsui Sekiyu Kagaku Kogyo K.K.) as a polyolefin type resin was extrusion laminated on both surface sides of the acid resistant paper so as to respectively form 20 μm thick resin layers, whereby a base material layer having a three layer structure was prepared.

One surface side of the resultant base material layer is subjected to a corona discharge treatment, and an isocyanate type adhesive (Takelac A310 and Takenate A 3, mfd. by Takeda Yakuhin Kogyo K.K.) was applied onto the thus treated surface to form an adhesive layer. Thereafter, on the thus formed adhesive layer, a 10 μm thick barrier layer comprising a polyamide resin (Nylon MXD6 grade 6007, mfd. by Mitsubishi Gas Kagaku K.K.), a 10 μm thick adhesive layer comprising an adhesive polyolefin resin (Addmer AT 499, mfd. by Mitsui Sekiyu Kagaku Kogyo K.K.), and a 30 μm thick inner layer comprising a low density polyethylene resin (Mirason 16sp, mfd. by Mitsui Sekiyu Kagaku Kogyo K.K.) were sequentially laminated in this order by co-extrusion laminating, thereby to provide a packaging material (Sample 1) as shown in FIG. 1.

(Sample 2)

An acid resistant paper having a basis weight of 400 g/m$^2$ was used as a support, and a low density polyethylene resin (Mirason 16sp, mfd. by Mitsui Sekiyu Kagaku Kogyo K.K.) as a polyolefin type resin was extrusion laminated on one surface side of the acid resistant paper so as to form a 20 μm thick resin layer, whereby a base material layer having a two layer structure was prepared.

One surface side of the resultant base material layer at which the paper surface was exposed, a low density polyethylene resin (Mirason 16sp, mfd. by Mitsui Sekiyu Kagaku Kogyo K.K.) was extrusion laminated, while a co-extrusion film having the following structure was fused thereto under heating to effect laminating, thereby to provide a packaging material (Sample 2). Such a laminating method is ordinarily referred to as poly sandwiching Structure of co-extrusion film (thickness: 40 μm) low density polyethylene (thickness: 10 μm)/adhesive polyethylene (thickness: 5 μm)/polyamide (nylon MXD6) (thickness: 10 μm)/adhesive polyethylene (thickness: 5 μm)/low density polyethylene (thickness: 10 μm)

In the above film, the low density polyethylene was the above Mirason 16sp (mfd. by Mitsui Sekiyu Kagaku Kogyo K.K.), the adhesive polyethylene was Addmer AT 499 (mfd. by Mitsui Sekiyu Kagaku Kogyo K.K.) and the polyamide resin (Nylon MXD6) was Nylon MXD6 grade 6007 (mfd. by Mitsubishi Gas Kagaku K.K.).

(Comparative Sample 1)

A packaging material (Comparative Sample 1) was prepared in the same manner as in the preparation of the above Sample 1 except that a polyamide resin (Nylon 6, mfd. by Mitsubishi Kasei K.K.) was used as the material constituting the barrier layer.

(Comparative Sample 2)

A packaging material (Comparative Sample 2) was prepared in the same manner as in the preparation of the above Sample 1 except that an ethylene-vinyl alcohol copolymer (Eval E, mfd. by Kuraray K.K.) was used as the material constituting the barrier layer.

Then, each of the packaging materials as prepared above was punched into a predetermined size and was formed into a container sample with a bottom by using a predetermined container formation process. With respect to each of the respective container samples with a bottom, the barrier property and the container strength thereof were evaluated under the following measurement conditions. The thus obtained results are shown in Table 1 appearing hereinafter.

(Measurement conditions)

Barrier Property

The container with a bottom had a dimensions of 70 mm×70 mm and a height of 180 mm, and was generally referred to as gable top type carton for containing therein a liquid food or drink such as milk and orange juice.

With respect to the barrier property, the oxygen permeability per one container was measured under normal temperature and normal pressure by use of a measurement device (trade name: Oxytran, mfd. by Modern Control Co.).

Strength of Container

The container with a bottom was dropped from a position having a height of 90 cm so that the lower surface disposed below, and the resultant state of liquid leakage was evaluated.

TABLE 1

| Sample | Barrier property (cc/container · 24 hr · atm) | Container strength Number of containers causing liquid leakage Number of tested containers |
|---|---|---|
| Sample 1 | 50 | 0.05 |
| Sample 2 | 50 | 0.02 |
| Comparative Sample 1 | 400 | 0.02 |
| Comparative Sample 2 | 80 | 0.5 |

As shown in the above Table 1, the containers formed from Samples 1 and 2 had both of a good barrier property and a high strength. On the other hand, the container formed from Comparative Sample 1 had a sufficient strength but was poor in the barrier property. Further, the container formed from Comparative Sample 2 had a good barrier property but only had an insufficient strength.

Experiment Example 2

(Sample 1)

First, a base material layer having a three layer structure was prepared in the same manner as in the preparation of Sample 1 in Experiment Example 1.

One surface side of the resultant base material layer way subjected to a corona discharge treatment, and an isocyanate type adhesive (Takelac A310 and Takenate A 3, mfd. by Takeda Yakuhin Kogyo K.K.) was applied onto the thus treated surface to form an adhesive layer. Thereafter, on the thus formed adhesive layer, a 10 μm thick barrier layer comprising a semi-aromatic polyamide resin (Novamid X21, mfd. by Mitsubishi Kasei K.K.) and a 30 μm thick inner layer comprising a carboxyl group containing polyethylene resin (New Kurel 0908C, mfd. by Mitsui Du Pont Polychemical K.K.) were sequentially laminated in this order by co-extrusion laminating, thereby to provide a packaging material (Sample 1) as shown in FIG. 3.

(Sample 2)

First, a base material layer having a two layer structure was prepared in the same manner as in the preparation of Sample 2 in Experiment Example 1.

One surface side of the resultant base material layer at which the paper surface was exposed, a low density polyethylene resin (Mirason 16sp, mfd. by Mitsui Sekiyu Kagaku Kogyo K.K.) was extrusion laminated, while a co-extrusion film having the following structure was fused thereto under heating to effect laminating, thereby to provide a packaging material (Sample 2).

Structure of co-extrusion film (thickness: 35 μm) low density polyethylene (thickness: 10 μm)/adhesive polyethylene (thickness: 5 μm)/Nylon MXD6 (thickness: 10 μm)/carboxyl group containing polyethylene (thickness: 10 μm)

In the above film, the lowdensity polyethylene was the above Mirason 16sp (mfd. by Mitsui Sekiyu Kagaku Kogyo K.K.), the adhesive polyethylene was Addmer AT 499 (mfd. by Mitsui Sekiyu Kagaku Kogyo K.K.), the Nylon MXD6 was Nylon MXD6 grade 6007 (mfd. by Mitsubishi Gas Kagaku K.K.), and the carboxyl group containing polyethylene resin was New Kurel 0908C (mfd. by Mitsui Du Pont Polychemical K.K.).

(Comparative Sample 1)

A packaging material (Comparative Sample 1) was prepared in the same manner as in the preparation of the above Sample 1 except that a polyamide resin (Nylon 6) (Novamid 1030, mfd. by Mitsubishi Kasei K.K.) was used as the material constituting the barrier layer.

(Comparative Sample 2)

A packaging material (Comparative Sample 2) was prepared in the same manner as in the preparation of the above Sample 1 except that an ethylene-vinyl alcohol copolymer (Eval E, mfd. by Kuraray K.K.) was used as the material constituting the barrier layer.

Then, each of the packaging materials as prepared above was punched into a predetermined size and was formed into a container sample with a bottom by using a predetermined container formation process. With respect to each of the respective container samples with a bottom, the barrier property and the container strength thereof were evaluated under the measurement conditions which were the same as those used in Experiment Example 1. The thus obtained results are shown in Table 2 appearing hereinafter.

TABLE 2

| Sample | Barrier property (cc/container · 24 hr · atm) | Container strength Number of containers causing liquid leakage Number of tested containers |
| --- | --- | --- |
| Sample 1 | 80 | 0.04 |
| Sample 2 | 80 | 0.04 |
| Comparative Sample 1 | 400 | 0.02 |
| Comparative Sample 2 | 80 | 0.5 |

As shown in the above Table 2, the containers formed from Samples 1 and 2 had both of a good barrier property and a high strength. On the other hand, the container formed from Comparative Sample 1 had a sufficient strength but was poor in the barrier property. Further, the container formed from Comparative Sample 2 had a good barrier property but only had an insufficient strength.

Experiment Example 3

(Sample 1)

First, a base material layer having a three layer structure was prepared in the same-manner as in the preparation of Sample 1 in Experiment Example 1.

Then, by use of the resultant base material layer, a packaging material (Sample 1) was prepared in the same manner as in the preparation of the above Sample 1 in Experiment Example 1 except that a semi-aromatic polyamide resin (Novamid X21, mfd. by Mitsubishi Kasei K.K.) was used as the material constituting the barrier layer.

(Sample 2)

A packaging material (Sample 2) was prepared in the same manner as in the preparation of the above Sample 2 in the Experiment Example 1 except that a co-extrusion film having the following structure was used instead of that used in Sample 2 of Experiment Example 1.

Structure of co-extrusion film (thickness: 40 µm) low density polyethylene (thickness: 10 µm)/adhesive polyethylene (thickness: 5 µm)/semi-aromatic polyamide resin (thickness: 10 µm)/adhesive polyethylene (thickness: 5 µm)/low density polyethylene (thickness: 10 µm)

In the above film, the low density polyethylene was the above Mirason 16sp (mfd. by Mitsui Sekiyu Kagaku Kogyo K.K.), the adhesive polyethylene was Addmer AT 499 (mfd. by Mitsui Sekiyu Kagaku Kogyo K.K.) and the semi-aromatic polyamide resin was Novamid X21 (mfd. by Mitsubishi Kasei Kogyo K.K.).

Then, each of the packaging materials as prepared above Samples 1 and 2 and Comparative Samples 1 and 2 prepared in Experiment Example 1 was punched into a predetermined size and was formed into a container sample with a bottom by using a predetermined container formation process. With respect to each of the respective container samples with a bottom, the barrier property and the container strength thereof were evaluated under the measurement conditions which were the same as those used in Experiment Example 1. The thus obtained results are shown in Table 3 appearing hereinafter.

TABLE 3

| Sample | Barrier property (cc/container · 24 hr · atm) | Container strength Number of containers causing liquid leakage Number of tested containers |
| --- | --- | --- |
| Sample 1 | 100 | 0.02 |
| Sample 2 | 100 | 0.02 |
| Comparative Sample 1 | 400 | 0.02 |
| Comparative Sample 2 | 80 | 0.5 |

As shown in the above Table 3, the containers formed from Samples 1 and 2 had both of a good barrier property and a high strength. On the other hand, the container formed from Comparative Sample 1 of Experiment Example 1 had a sufficient strength but was poor in the barrier property. Further, the container formed from Comparative Sample 2 of Experiment Example 1 had a good barrier property but only had an insufficient strength.

Experiment Example 4

(Sample 1)

First, a base material layer having a three layer structure was prepared in the same manner as in the preparation of Sample I in Experiment Example 1.

One surface side of the resultant base material layer is subjected to a corona discharge treatment, and on the thus treated surface, a 10 µm thick adhesive layer comprising an adhesive polyolefin resin (Addmer AT 499, mfd. by Mitsui Sekiyu Kagaku Kogyo K.K.), and a 10 µm thick inner layer having a barrier property and comprising a semiaromatic polyamide resin (Novamid X21, mfd. by Mitsubishi Kasei K.K.), were sequentially laminated in this order by co-extrusion laminating, thereby to provide a packaging material (Sample 1) as shown in FIG. 4.

(Sample 2)

First, a base material layer having a two layer structure was prepared in the same manner as in the preparation of Sample 2 in Experiment Example 1.

One surface side of the resultant base material layer at which the paper surface was exposed, a low density polyethylene resin (Mirason 16sp, mfd. by Mitsui Sekiyu Kagaku Kogyo K.K.) was extrusion laminated, while a co-extrusion film having the following structure was fused thereto under heating to effect laminating, thereby to provide a packaging material (Sample 2).

Structure of co-extrusion film (thickness: 25 µm) low density polyethylene (thickness: 10 µm)/adhesive polyethylene (thickness: 5 µm)/semi-aromatic polyamide resin (thickness: 10 µm).

In the above film, the low density polyethylene was the above Mirason 16sp (mfd. by Mitsui Sekiyu Kagaku Kogyo K.K.), the adhesive polyethylene was Addmer AT 499 (mfd. by Mitsui Sekiyu Kagaku Kogyo K.K.), and the semi-aromatic polyamide resin was Novamid X21 (mfd. by Mitsubishi Kasei Kogyo K.K.).

(Comparative Sample 1)

A packaging material (Comparative Sample 1) was prepared in the same manner as in the preparation of the above Sample 1 except that a polyethylene resin (PETG 6763, mfd. by Eastman Kodak Co.) was used as the material constituting the inner layer having a barrier property.

(Comparative Sample 2)

A packaging material (Comparative Sample 2) was prepared in the same manner as in the preparation of the above Sample 1 except that an ethylene-vinyl alcohol copolymer (Eval E, mfd. by Kuraray K.K.) was used as the material constituting the inner layer having a barrier property.

Then, each of the packaging materials as prepared above was punched into a predetermined size and was formed into a container sample with a bottom by using a predetermined container formation process. With respect to each of the respective container samples with a bottom, the barrier property and the container strength thereof were evaluated under the measurement conditions which were the same as those used in Experiment Example 1. The thus obtained results are shown in Table 4 appearing hereinafter.

TABLE 4

| Sample | Barrier property (cc/container · 24 hr · atm) | Container strength Number of containers causing liquid leakage Number of tested containers |
|---|---|---|
| Sample 1 | 80 | 0.04 |
| Sample 2 | 80 | 0.04 |
| Comparative Sample 1 | 500 | 0.8 |
| Comparative Sample 2 | 100 | 0.5 |

As shown in the above Table 4, the containers formed from Samples 1 and 2 not only had both of a good barrier property and a high strength. On the other hand, the container formed from Comparative Samples 1 and 2 had an insufficient strength and were poor in the barrier property.

Experiment Example 5

(Sample 1)

An acid resistant paper having a basis weight of 400 g/m$^2$ was used as an intermediate layer, and a low density polyethylene resin (Mirason 16 sp, mfd. by Mitsui Sekiyu Kagaku Kogyo K.K.) was extrusion laminated on one surface side of the acid resistant paper, and a semi-aromatic polyamide resin (Novamid X 21, mfd. by Mitsubishi Kasei Kogyo K.K.) was extrusion laminated on the other surface side thereof to form a 20 μm thick outermost layer and a 30 μm thick inner layer, respectively, whereby a laminate sheet having a three layer structure was prepared.

The thus prepared laminate sheet for a composite container was punched into a blank having a predetermined shape corresponding to a gable top type container. Then, a pouring member comprising an integrally molded member comprising an adhesive polyolefin resin (Addmer AT 469C, mfd. by Mitsui Sekiyu Kagaku Kogyo K.K.) was inserted into an opening portion which had been formed in the above blank in advance, and thereafter the flange portion of the pouring member was fused to the inner peripheral surface layer of the above laminate sheet while being heated.

A composite container (Sample 1) having a barrier property and equipped with the pouring member was prepared according to an ordinary process by use of the blank to which the pouring member had been fixed in the above manner.

(Sample 2)

A composite container (Sample 2) having a barrier property and equipped with a pouring member was prepared in the same manner as in the preparation of the above Sample 1 except that a pouring member comprising an integrally molded member comprising a semi-aromatic polyamide resin (Novamid X21, mfd. by Mitsubishi Kasei Kogyo K.K.) was used instead of the pouring member used in the preparation of Sample 1.

With respect to the thus prepared Samples 1 and 2, the adhesion property between the pouring member and the main body of the container was evaluated in the following manner. Thus, when the pouring member and the main body of the container were intended to be separate from each other by using hands, the separation or peeling did not occur between the bonded surface (or bond interface) between the above two members but there occurred a separation (i.e., a so-called paper peeling) between the acid resistant paper layers constituting the main body of the composite container. As a result, it was confirmed that the adhesion property between the pouring member and the composite container was good.

(Comparative Sample 1)

A composite container (Comparative Sample 1) equipped with a pouring member was prepared in the same manner as in the preparation of the above Sample 1 except that a pouring member comprising an integrally molded member comprising a low density polyethylene resin (Mirason 16 sp, mfd. by Mitsui Sekiyu Kagaku Kogyo K.K.) was used instead of the pouring member used in the preparation of Sample 1.

With respect to the thus prepared Comparative Sample 1, the adhesion property between the pouring member and the main body of the container was evaluated in the same manner as in the case of the above Sample 1. As a result, it was confirmed that the pouring member and the main body of the composite container were easily separated from each other at the bond interface therebetween.

(Comparative Sample 2)

A composite container (Comparative Sample 2) equipped with a pouring member was prepared in the same manner as in the preparation of the above Sample 2 except that a pouring member comprising an integrally molded member comprising a low density polyethylene resin (Mirason 16 sp, mfd. by Mitsui Sekiyu Kagaku Kogyo K.K.) was used instead of the pouring member used in the preparation of Sample 2.

With respect to the thus prepared Comparative Sample 2, the flavor barrier property and the adhesion property between the pouring member and the main body of the container were evaluated. As a result, it was confirmed that the Comparative Sample 2 had a good flavor barrier property but the pouring member and the main body of the composite container were easily separated from each other at the bond interface therebetween.

(Comparative Sample 3)

An acid resistant paper having a basis weight of 400 g/m$^2$ was used as a support, and a low density polyethylene resin (Mirason 16sp, mfd. by Mitsui Sekiyu Kagaku Kogyo K.K.) was extrusion laminated on both surface sides of the acid resistant paper so as to respectively form 20 μm thick resin layers, whereby a laminate sheet for a composite container layer having a three layer structure was prepared.

A composite container (Comparative Sample 3) equipped with a pouring member was prepared in the same manner as in the preparation of the above Sample 1 except that the thus prepared laminate sheet for a composite container was used instead of the laminate sheet used in the preparation of Sample 1.

With respect to the thus prepared Comparative Sample 3, the adhesion property between the pouring member and the main body of the container was evaluated in the same manner as in the case of the above Sample 1. As a result, it was confirmed that the pouring member and the main body of the composite container were easily separated from each other at the bond interface therebetween.

(Comparative Sample 4)

An acid resistant paper having a basis weight of 400 g/m$^2$ was used as a support, and a low density polyethylene resin (Mirason 16sp, mfd. by Mitsui Sekiyu Kagaku Kogyo K.K.) was extrusion laminated on both surface sides of the acid resistant paper so as to respectively form 20 μm thick resin layers, whereby a laminate sheet for a composite container layer having a three layer structure was prepared.

A composite container (Comparative Sample 4) equipped with a pouring member was prepared in the same manner as in the preparation of the above Sample 2 except that the thus prepared laminate sheet for a composite container was used instead of the laminate sheet used in the preparation of Sample 2.

With respect to the thus prepared Comparative Sample 4, the flavor barrier property and the adhesion property between the pouring member and the main body of the container were evaluated. As a result, it was confirmed that the Comparative Sample 4 was poor in the flavor barrier property and the pouring member and the main body of the composite container were easily separated from each other.

Experiment Example 6

(Sample 1)

First, a laminate sheet for a composite container having a three layer structure was prepared in the same manner as in the preparation of Sample 1 in Experiment Example 5.

The thus prepared laminate sheet for a composite container was punched into a blank having a predetermined shape corresponding to a gable top type container. Then, a pouring member was inserted into an opening portion which had been formed in the above blank in advance, from the inner side layer of the composite container by the medium of a laminating material having the following layer structure, and thereafter the flange portion of the pouring member, the inner surface layer of the above laminate sheet and the laminating material were fused to each other while being heated. At this time, the laminating material was disposed between the inner surface layer and the flange portion of the pouring member so that the semi-aromatic polyamide resin layer of the laminating material was disposed opposite to the inner layer of the laminate sheet.

Structure of laminating material semi-aromatic polyamide resin (thickness: 30 μm)/base material layer (thickness: 12 μm)/polyolefin type resin layer (thickness: 40 μm).

In the above laminating material, the semi-aromatic polyamide resin was Novamid X 21 (mfd. by Mitsubishi Kasei Kogyo K.K.), the polyolefin type resin was a low density polyethylene resin (Mirason 16sp, mfd. by Mitsui Sekiyu Kagaku Kogyo K.K.). Further, the base material layer was formed by use of a biaxially oriented polyester resin.

In addition, the above pouring member was one comprising an integrally molded member comprising a polyolefin type resin.

A composite container (Sample 1) having a barrier property and equipped with the pouring member was prepared according to an ordinary process by use of the blank to which the pouring member had been fixed in the above manner.

With respect to the thus prepared Sample 1, the adhesion property between the pouring member and the main body of the composite container was evaluated in the same manner as in Experiment Example 5. As a result, it was confirmed that the adhesion property between the pouring member and the main body of the composite container was good.

(Sample 2)

A composite container (Sample 2) having a barrier property and equipped with a pouring member was prepared in the same manner as in the preparation of the above Sample 1 except that a laminating material having the following layer structure was used instead of that used in Sample 1.

Structure of laminating material semi-aromatic polyamide resin (thickness: 50 μm)/polyolefin type resin layer (thickness: 50 μm)

In the above laminating material, the semi-aromatic polyamide resin was Novamid X 21 (mfd. by Mitsubishi Kasei Kogyo K.K.), the polyolefin type resin was a low density polyethylene resin (Mirason 16sp, mfd. by Mitsui Sekiyu Kagaku Kogyo K.K.).

With respect to the thus prepared Sample 2, the adhesion property between the pouring member and the main body of the composite container was evaluated in the same manner as in the case of Sample 1. As a result, it was confirmed that the adhesion property between the pouring member and the main body of the composite container was good.

(Comparative Sample 1)

A composite container (Comparative Sample 1) equipped with a pouring member was prepared in the same manner as in the preparation of the above Sample 1 except that a laminating material was not used.

With respect to the thus prepared Comparative Sample 1, the adhesion property between the pouring member and the main body of the composite container was evaluated in the same manner as in the case of Sample 1. As a result, it was confirmed that the pouring member and the main body of the composite container were easily separated from each other at the bond interface therebetween.

(Comparative Sample 2)

An acid resistant paper having a basis weight of 400 g/M$^2$ was used as a support, and a low density polyethylene resin (Mirason 16 sp, mfd. by Mitsui Sekiyu Kagaku Kogyo K.K.) was extrusion laminated on both surface sides of the acid resistant paper so as to respectively form 20 μm thick resin layers, whereby a laminate sheet for a composite container having a three layer structure was prepared.

The thus prepared laminate sheet for a composite container was punched into a blank having a predetermined shape corresponding to a gable top type container. Then, a pouring member comprising an integrally molded member comprising an adhesive polyolefin resin was inserted into an opening portion which had been formed in the above blank in advance, and thereafter the flange portion of the pouring member was fused to the above blank while being heated.

A composite container (Comparative Sample 2) equipped with the pouring member was prepared according to an ordinary process by use of the blank to which the pouring member had been fixed in the above manner.

With respect to the thus prepared Comparative Sample 2, the flavor barrier property and the adhesion property between the pouring member and the main body of the container were evaluated. As a result, it was confirmed that the pouring member and the main body of the composite container were not easily separated from each other, but the Comparative Sample 2 was poor in the flavor barrier property.

What is claimed is:

1. A composite container having a barrier property and comprising a packaging material which comprises:
   an inner surface layer comprising a polyolefin resin,
   a barrier layer, and
   a base material layer wherein at least an outermost layer thereof comprises an olefin resin,
   wherein the barrier layer consists essentially of polyamide resin, said polyamide resin being a copolymer comprising an aromatic polyamide forming component of 60 to 100 weight % and an aliphatic polyamide forming component of 0 to 40 weight %, the aromatic polyamide forming component comprising an aliphatic diamine and at least one of isophthalic acid and terephthalic acid, the aliphatic polyamide forming component comprising a lactam or an aliphatic diamine and an aliphatic dicarboxylic acid, said barrier layer having a thickness effective for being provided with a sufficient oxygen barrier property.

2. A composite container having a barrier property according to claim 1, wherein the inner surface layer comprises a carboxyl group containing polyethylene resin.

3. A composite container having a barrier property according to claim 1, wherein the base material layer has a three layer structure comprising a polyolefin resin layer, a support and a polyolefin resin layer.

4. A composite container having a barrier property according to claim 1, wherein the base material layer has a two layer structure comprising a polyolefin resin layer and a support.

5. A composite container having a barrier property according to claim 1, further comprising an adhesive layer between the inner surface layer and the barrier layer.

6. A composite container having a barrier property according to claim 1, further comprising an adhesive layer between the barrier layer and the base material layer.

7. A composite container having a barrier property according to claim 6, further comprising an adhesive layer between the inner surface layer and the barrier layer.

8. A composite container according to claim 1 wherein said barrier layer has a thickness of 5 to 60 $\mu$m.

9. A composite container according to claim 1, wherein said polyamide resin is a polymer composed of the aromatic polyamide forming component.

10. A composite container having a barrier property and comprising a packaging material which comprises:

an inner surface layer having a barrier property, and a base material layer wherein at least an outermost layer thereof comprises an olefin resin, wherein the inner surface layer having the barrier property consists essentially of a polyamide resin, said polyamide resin being a copolymer comprising an aromatic polyamide forming component of 60 to 100 weight % and an aliphatic polyamide forming component of 0 to 40 weight %, the aromatic polyamide forming component comprising an aliphatic diamine and at least one of isophthalic acid and terephthalic acid, the aliphatic polyamide forming component comprising a lactam or an aliphatic diamine and an aliphatic dicarboxylic acid, said barrier layer having a thickness effective for being provided with a sufficient oxygen barrier property.

11. A composite container having a barrier property according to claim 10, wherein the base material layer has a three layer structure comprising a polyolefin resin layer, a support and a polyolefin resin layer.

12. A composite container having a barrier property according to claim 10, wherein the base material layer has a two layer structure comprising a polyolefin resin layer and a support.

13. A composite container having a barrier property according to claim 10, further comprising an adhesive layer between the inner surface layer having a barrier property and the base material layer.

14. A composite container according to claim 10, wherein said inner surface layer has a thickness of 5 to 60 $\mu$m.

15. A composite container according to claim 10, wherein said polyamide resin is a polymer composed of the aromatic polyamide forming component.

* * * * *